Nov. 1, 1938.   A. SCHMALENBACH   2,135,356
EXTRACTION OF BENZENE AND ITS HOMOLOGUES FROM GASES CONTAINING AMMONIA
Filed Dec. 11, 1935
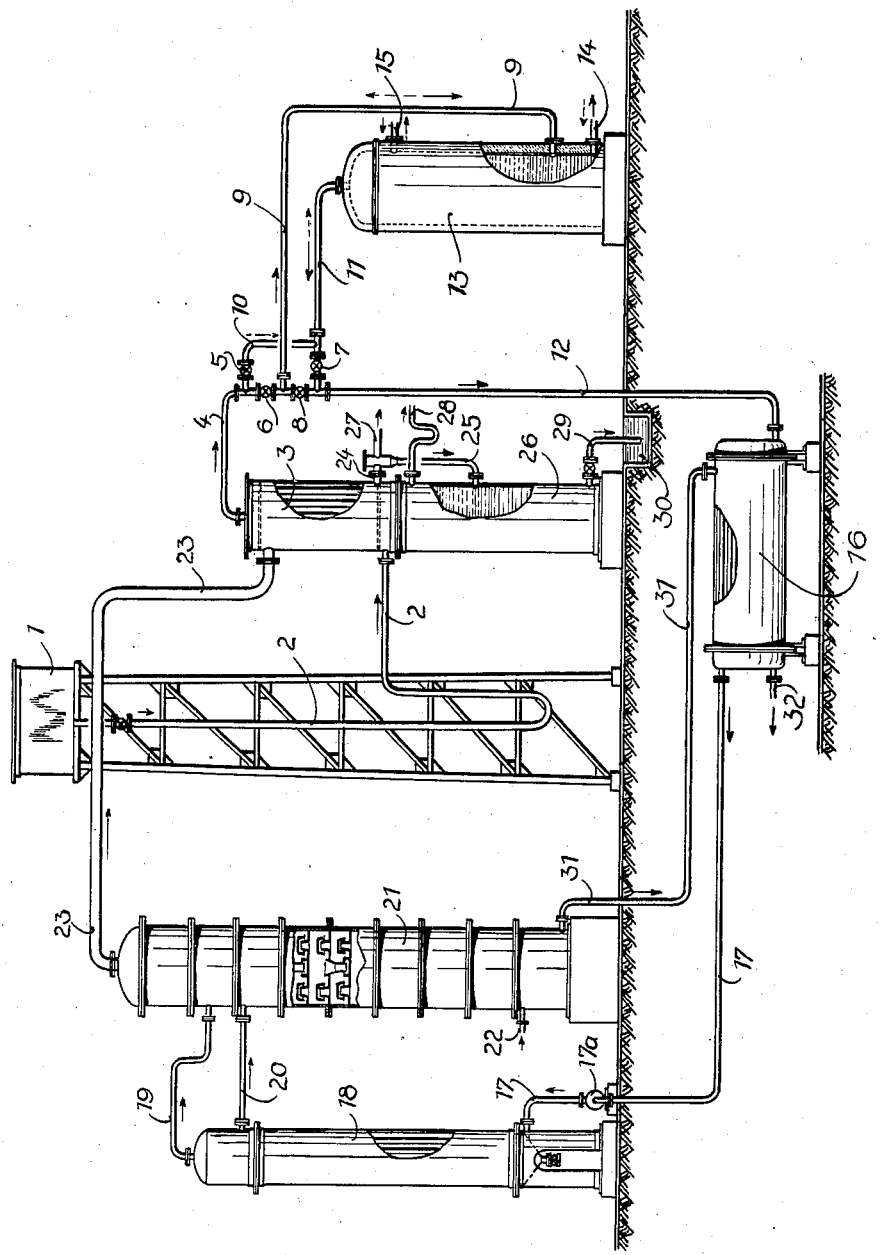
Inventor:
Adolf Schmalenbach
By Henry Love Clarke
atty Patented Nov. 1, 1938

2,135,356

UNITED STATES PATENT OFFICE 2,135,356

EXTRACTION OF BENZENE AND ITS HOMOLOGUES FROM GASES CONTAINING AMMONIA

Adolf Schmalenbach, Essen-on-the-Ruhr, Germany, assignor, by mesne assignments, to Koppers Company, Pittsburgh, Pa., a corporation of Delaware Application December 11, 1935, Serial No. 53,986
In Germany February 9, 1934

3 Claims. (Cl. 260—674)

The invention relates to the extraction of benzene and its homologues or other hydrocarbons from gases containing ammonia, more particularly coal distillation gases or the like, wherein benzene and its homologues are washed out of the gas by means of a washing oil from which the benzene and the homologues are extracted by means of distillation treatment after preheating.

The treatment of gases containing ammonia with the usual benzene extraction process used in coke and gas plants in which the benzene is washed out by means of a washing oil, for example coal-tar oil has hitherto presented considerable difficulties. The usual iron apparatus which is commonly used on account of its cheapness cannot be used with the treatment of gases containing ammonia as it very quickly corrodes through the action of the hot ammonia liquor which cannot be prevented from being extracted from the gas by the washing oil. It was therefore always necessary hitherto to separate the ammonia from the gases before the extraction of the benzene. On this account the extraction of benzene is often unprofitable and it is to be noticed that the separation of ammonia involves considerable cost if it is not accompanied with the production of crystallized ammonium sulphate or concentrated ammonia liquor. Both methods for utilizing the ammonia require however substantially expensive apparatus (saturating or separating apparatus) as well as a large operating staff so that they are only practical for the preparation of large quantities of ammonia.

The costs resulting from the separation of ammonia from gases and the accompanying expenses are so considerable that as a rule where it is a question of preparing only a relatively small quantity of gas, the benzene and ammonia are not extracted, although the benzene, particularly nowadays, is a valuable product which considerably increases the economical operation of a coal distillation plant. As a matter of fact at the present day only a very small number of gas works of small output extract benzene.

The object of the present invention is to enable the extraction of benzene from coal distillation gases and the like containing ammonia to be carried out with the use of the known washing oil process, without previous separation of the ammonia.

The process according to the invention consists in that the washing oil which in addition to benzene and homologues also contains a definite quantity of ammonia liquor, is maintained for a definite time, before its introduction into the distillation apparatus of the benzene plant, at a temperature at which the difference in the specific gravity of the washing oil on one hand and of the ammonia liquor on the other is so large that the two liquids separate from each other, whereafter the washing oil freed of ammonia liquor is conveyed into the apparatus for the extraction of the benzene and homologues.

This settling process is preferably accompanied by a washing of the oil with water. With normal washing oil, the separation of the water takes place at about 60° C.

The drawing illustrates a side elevation of the apparatus serving to carry out the process according to the invention.

In the device illustrated the raw washing oil coming from the benzene washers is stored in a container 1. This container is connected by means of a pipe 2 with a cooler 3, the purpose of which will be explained later. The crude washing oil serves as a cooling means in the cooler 3, and is thus heated. The heated washing oil passes out from the pipe 4, which is connected by means of stop cocks 5, 6, 7, 8 with the pipes 9, 10, 11 and 12. These pipes can be connected with each other by means of a suitable adjustment of the regulating valves so that the crude washing oil first of all flows out from the pipe 4 into the pipe 9, or through the circulating pipe 10 into the pipe 11.

The pipes 9 and 11 are connected with a substantially cylindrical separating apparatus 13, the pipe 9 being connected to the vessel 13 near the bottom and the pipe 11 to the top of the same. In addition the vessel 13 is connected with the pipes 14 and 15 through which water can be supplied to the vessel 13 as required.

The pipe 12 leads to an oil heater 16. The pre-heated oil is supplied by means of a pump 17a through the pipe 17 into the heating device 18 in which the oil is heated by means of steam. The resulting steam and the hot washing oil pass through the pipes 19 or 20 into the separating apparatus 21.

In the device illustrated in the drawing the separating apparatus consists of a column, provided with several floors, in which steam is introduced at the bottom through the pipe 22, and serves to heat the washing oil directly.

In the treatment in the column 21 benzene and homologues are separated from the washing oil together with the steam; the steam flows through the pipe 23 and then passes into the pre-heated cooling device 3. This cooling device is constructed as an indirect tube cooler. The cooling is carried out by means of the untreated washing oil from the container 1. A part of the distillation product condenses there and flows through the pipes 24 and 25 to a separating apparatus 26, whilst the uncondensed distillation product passes through the tube 27 to a rectifying device, not illustrated in the drawing. The upper end of the separating apparatus 26 is also connected with this rectifying device by means of the pipe 28. In the separating apparatus 26 the water separates from the benzene and homologues. The benzene and homologues float on the water so that they can be removed without difficulty through the top pipe 28. The water flows through the pipe 29 into the trench 30.

This means that the washing oil freed from benzene and homologues in the apparatus 21 is conveyed through the pipe 31 connected to the bottom of the column 21 to the heater or heat exchange apparatus 16 in which it gives up its heat to the undistilled washing oil. The cooled washing oil finally flows through the pipe 32 and is then conveyed into the benzene washing plant for re-use.

The method of operation of the plant illustrated in the drawing is carried out as follows:—

The crude washing oil coming from the container 1 is pre-heated in the device 3 to about 60°. It then flows through the pipes 4, 10 and 11 to the device 13 which is of such dimensions that the oil is maintained at a temperature of 60° for a definite time in the device 13. As required by the circumstances the temperature of the oil in the device 13 can be maintained by means of a suitable heating, and heat insulation of the container. In the container 13 the water separates from the oil. The water floats on the oil and is removed from the pipe 15 whilst oil free from water is conveyed through the pipes 9 and 12 into the heat exchange apparatus 16 and from there to the distillation apparatus. During the separation of water, fresh water is preferably introduced through the pipe 14 to the device 13. In this way it is possible to separate practically all the ammonia, or as much of the same as can cause corrosion in the separating apparatus.

The treatment of the washing oil in the device 13 is preferably carried out continuously. Similarly the washing water also is preferably supplied through the pipe 14 in a steady flow.

If an oil having a specific gravity lighter than water is used to wash out the benzene from the gas, the direction of flow of the liquids of the device 13 is reversed. By means of a suitable adjustment of the valves 5, 6, 7 and 8, crude washing oil is introduced through the pipe 9 into the lower end of the pipe 13 and the washing oil freed from water is removed through the pipe 11, similarly the direction of flow of the washing water is then reversed and fresh water is introduced through the pipe 15, and water containing ammonia is removed through the pipe 14.

I have described my invention above, with reference to one example of construction but without limiting the invention to the above description. The invention may however, be varied as desired within the scope of the following claims. The right to make further claims is strictly reserved.

I claim:

1. In a process for recovering benzene and its homologues and ammonia from coal distillation gases containing the same, which comprises: washing the coal gas while it still contains its ammonia and benzol and homologues with a benzol absorbent wash oil so as to concurrently remove in a single scrubbing step both the ammonia and the benzol and its homologues by the medium of the benzol absorbent wash oil; heating the spent absorbent oil, after it leaves the gas but while still containing the absorbed ammonia and benzol and homologues, to a temperature at which the ammonia liquor and the absorbent oil with its absorbed benzol and homologues oil will separate from each other by gravity; maintaining absorbent oil at this temperature while separating the ammonia liquor from the absorbent oil by gravitational separation by their differences in specific gravity, and then removing them from each other; thereafter distilling the removed absorbent oil to liberate the benzol and homologues therefrom; and thereafter returning the benzol absorbent wash oil, freed of ammonia and benzol, to the aforesaid single gas washing step.

2. A process as claimed in claim 1 and in which the benzol absorbent wash oil is constituted of coal-tar oil, and in which the aforesaid heating for the spent coal tar oil is effected to a temperature of approximately 60° C.

3. A process as claimed in claim 1 and in which the spent benzol absorbent wash oil is washed with water during the gravitational separation to more completely separate the ammonia from the absorbent oil before the subsequent distillation thereof to liberate the benzol thereof.

ADOLF SCHMALENBACH.